May 21, 1929. W. H. BASSETT Re. 17,296

HOLLOW CONDUCTOR

Original Filed Oct. 3, 1924

Inventor
WILLIAM H. BASSETT.
By His Attorney
Usina & Rauber

Reissued May 21, 1929. Re. 17,296

UNITED STATES PATENT OFFICE.

WILLIAM H. BASSETT, OF CHESHIRE, CONNECTICUT, ASSIGNOR TO THE AMERICAN BRASS COMPANY, OF WATERBURY, CONNECTICUT, A CORPORATION OF CONNECTICUT.

HOLLOW CONDUCTOR.

Original No. 1,597,422, dated August 24, 1926, Serial No. 741,343, filed October 3, 1924. Reissue No. 17,156, dated December 11, 1928, Serial No. 192,124, filed May 17, 1927. This application for reissue filed February 14, 1929. Serial No. 339,963.

My invention relates to hollow conductors which are of relatively large diameter for a given cross-sectional area of the conducting material so as to permit them to be used for high voltage transmission without substantial corona loss or for other purposes requiring maximum diameter and surface with reduced cross-section of conducting material, and has for its object to produce a new and improved hollow conductor of the required flexibility, high resistance to mechanical injury liable to result from crushing stresses, high tensile strength, maximum conducting efficiency, and relatively low weight. My improved conductor may be used bare or insulated as occasion requires.

Conductors heretofore made have been open to various objections. Thus, solid conductors of economic cross section when used for high voltage transmission are of such small diameter that the corona losses are so great as to render the transmission relatively inefficient, a disadvantage which numerous inventors have attempted to overcome by making the conductors hollow and thus increasing the diameter of the conductors relatively to the cross-sectional area of the conducting material.

It has been proposed to make such hollow conductors in various ways, all which, however, have been found subject to certain disadvantages, which it is the purpose of my present invention to obviate.

A cable embodying my invention is shown in the accompanying drawings, in which:—

Figure 1:
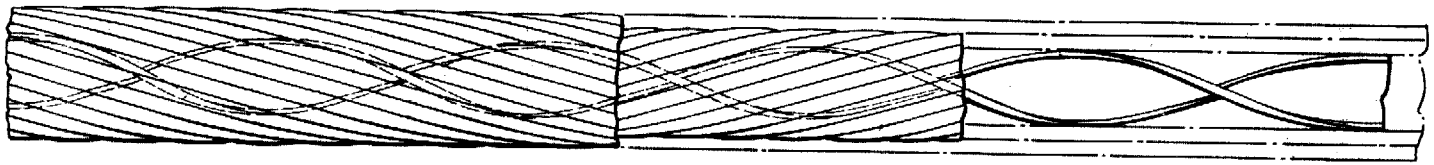
Fig. 1 shows a portion of the cable partly in side elevation and partly broken away.
Figure 4:
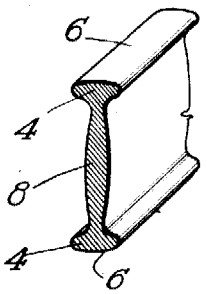
Fig. 4 shows, on an enlarged scale, a modified form of strip.
Figure 3:
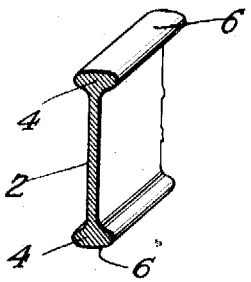
Fig. 3 shows a portion of the strip on an enlarged scale.

Referring more particularly to the drawings, 2 represents a twisted strip having at its edges laterally projecting portions or flanges forming thickened edges or head 4—4 so as to make it substantially I-shaped in cross-section. The outer surfaces 6—6 of these heads are curved so as to substantially conform to the inner surfaces of wires or strands cabled thereon. The central part 8 of the body portion of the strip may be thickened so as to give the strip greater tensile strength as shown in Fig. 4. The twisted strip is twisted about its longitudinal axis, the preferable pitch being about one complete twist to four inches for a strip five-eighths of an inch in width. A strip of such width whose body portion is .040 of an inch thick and whose edges are .090 of an inch thick gives satisfactory results.

About the twisted strip, wires or strands 10 are cabled and if desired another layer of wires or strands 12, thus making up the completed cable as shown. As shown in the drawings the wires or strands are round but obviously that form of wire or strand is not necessary to the embodiment of the invention.

In forming the cable the strip in untwisted form with its projecting flanges is first produced. It is then twisted as shown and then fed to a cabling machine where it is surrounded with one or more layers of conducting wires or strands thus producing the complete cable.

The thickened edges of the core are of especial importance in connection with the manufacture of the cable. Where a flat strip is used, the strip being twisted often suddenly changes from a spiral twist to a helical twist or curl which would continue for a foot or more before it could be stopped. In some cases in working with the flat strip this has happened so often as to spoil the entire lot even for experimental purposes. A single spot where the twist has changed from a spiral form to a helical form ruins the core for commerical purposes. When the strip has the flanges described herein this difficulty is eliminated, and cores many miles in length can be made without defects in the twist.

Figure 2:
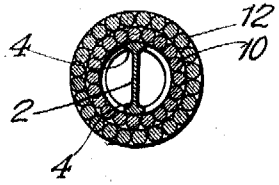
Fig. 2 shows a transverse section of the same on the line 2—2 of Fig. 1.

The use of two and maybe more layers of conducting wires or strands, and of different sizes, as in Fig. 2, has a special value in the production and use of the hollow style of cable. The metallic cross section is fixed by the requisite current carrying capacity and the outside diameter is fixed by the required voltage and the altitude of the line. By making the conductor in two layers, the flexibility of the cable is improved and by using wires of different sizes in two layers, the combination of the determined current carrying capacity or metallic cross section and required outside diameter can be more closely approximated under the conditions of operation.

It is also important to have a comparatively wide bearing of the inner conducting wires on the core. A better cable to meet all these required conditions can be designed by using a plurality of layers, each layer made of strands which in turn consist of several wires and the wires or strands in the cable being spiralled in the same direction or in different directions.

The flanges on the twisted strip constitute in effect a hollow spiral with a comparatively wide bearing face for the strands, the body portion constituting a comparatively narrow support extending across the interior of the hollow spiral; and the invention includes various other constructions than that specifically illustrated embodying the combination of hollow core and internal support.

Various other means than the flanges described may be used for stiffening the strip against longitudinal bending and for thus opposing its changing from the desired spiral twist to a helical twist.

The thickened edges of the core and the wires surrounding it, being located remote from the center of the cable, are therefore located where they act most effectively for conducting current, as it is well known that alternating current tends to be more dense as the distance from the center of a conductor is increased. Thus the metal in the core is so distributed that it acts efficiently as a conducting path as well as a supporting member.

The same type of hollow conductor is advantageous for other purposes requiring large diameter and surface with relatively small cross-section of conducting material. The major part of the conducting material, including the cabled wires and the flanges on the strip is distributed at the outer portions of the cable so that, when alternating currents are used at frequencies which tend to concentrate the current toward the outside surface, the conducting material is used efficiently. Moreover, the amount of heat dissipated from the hollow conductor described is greater than from a conductor of equal cross section of conducting material and smaller diameter. These considerations make the present conductor very useful not only for high voltages but also for carrying extra heavy currents which would be usually at comparatively low voltages.

While the core may be of the same material as the conducting wires or strands cabled about it, it may be made of other suitable metal alloy. I preferably make the conducting strands or wires of copper alloy and make the twisted strip of copper or similar alloy. Such copper or copper alloys (which I refer to generically as cuprous metal) can be effectively worked and provide the necessary strength and stress resisting characteristics. Where more than one layer of wires or strands are used they may be spiralled in either direction but I prefer to cable the inner layer around in a direction opposite to the twist of the strip and the succeeding layer in the same direction as the twist of the strip.

Various other modifications may be made by those skilled in the art without departing from the invention as defined in the following claims.

What I claim is:

1. In a conducting cable comprising a series of strands cabled so as to form a tube, a core formed by a twisted strip having thickened conducting portions forming spiral surfaces engaged by said strands and supporting the same.

2. In a conducting cable comprising a series of strands cabled so as to form a tube, a core formed by a twisted strip having a body portion and projecting flanges forming thickened edges thereon, said flanges providing thickened conducting portions and spiral surfaces engaged by said strands and supporting the same.

3. In a conducting cable comprising a series of strands cabled so as to form a tube, a core formed of a twisted strip having a thin body portion and projecting flanges upon its edges so as to have an I-shaped cross-section, said flanges providing thickened conducting portions and spiral surfaces supporting said strands.

4. In a conducting cable comprising a series of strands cabled so as to form a tube, a core formed by a twisted strip having a body portion and projecting flanges forming thickened edges thereon, said flanges providing thickened conducting portions and spiral surfaces engaged by said strands and supporting the same, said spiral surfaces being curved transversely so as to substantially conform to the inner surface of the tube.

5. In a conducting cable comprising a series of strands cabled so as to form a tube, a core formed by a twisted strip having a body portion and projecting flanges forming thickened edges thereon, said flanges providing thickened conducting portions and spiral surfaces engaged by said strands and supporting the same, said thickened conducting portions being about twice as thick as the adjacent body portion.

6. A conducting cable comprising a series of strands cabled so as to form a tube and a core including a twisted strip and means for stiffening said strip against longitudinal bending.

7. In a conducting cable comprising a series of strands cabled so as to form a tube, a core formed by a twisted strip having a body portion and projecting flanges, said flanges forming a comparatively wide-faced spiral bearing for the cabled strands and said body portion forming a comparatively narrow transverse support.

8. A flexible conductor which is hollow so as to have a comparatively large external surface with reduced metallic cross-section, said conductor comprising strands cabled so as to form a tube, comparatively wide-faced spiral bearing means for the internal surface of said tube of cabled strands and comparatively narrow supporting means extending diametrically across the space between opposite portions of said bearing means.

9. A flexible conductor which is hollow so as to have a comparatively large external surface with reduced metallic cross-section, said conductor comprising strands cabled so as to form a tube and arranged in in a plurality of layers, the strands of the respective layers being of different sizes and being of cuprous metals, comparatively wide-faced spiral bearing means for the internal surface of said tube of cabled strands and comparatively narrow supporting means extending diametrically across the space between opposite portions of said bearing means.

In witness whereof, I have hereunto signed my name.

WILLIAM H. BASSETT.

DISCLAIMER

Reissue No. 17,296.—*William H. Bassett*, Cheshire, Conn. HOLLOW CONDUCTOR. Patent dated May 21, 1929. Disclaimer filed March 13, 1931, by the assignee, *The American Brass Company*.

Hereby enters this disclaimer to claim 6 of said specification which is in the following words, to wit:

"A conducting cable comprising a series of strands cabled so as to form a tube and a core including a twisted strip and means for stiffening said strip against longitudinal bending."

[*Official Gazette April 14, 1931.*]